US010985355B2

(12) United States Patent
Wang et al.

(10) Patent No.: US 10,985,355 B2
(45) Date of Patent: Apr. 20, 2021

(54) METHOD FOR PRODUCING FUNCTIONAL FILM, CONTROL DEVICE, AND CONTROL METHOD

(71) Applicant: Sumitomo Chemical Company, Limited, Tokyo (JP)

(72) Inventors: Jian Wang, Daegu (KR); Rikuri Uejima, Niihama (JP)

(73) Assignee: SUMITOMO CHEMICAL COMPANY, LIMITED, Tokyo (JP)

( * ) Notice: Subject to any disclaimer, the term of this patent is extended or adjusted under 35 U.S.C. 154(b) by 0 days.

(21) Appl. No.: 15/297,686

(22) Filed: Oct. 19, 2016

(65) Prior Publication Data

US 2017/0113247 A1  Apr. 27, 2017

(30) Foreign Application Priority Data

Oct. 23, 2015  (JP) .............. JP2015-209334
Oct. 14, 2016  (JP) .............. JP2016-202981

(51) Int. Cl.
B05D 1/26       (2006.01)
B05D 3/02       (2006.01)
H01M 2/16       (2006.01)
H01M 2/14       (2006.01)
H01M 10/052     (2010.01)

(52) U.S. Cl.
CPC ......... *H01M 2/1686* (2013.01); *H01M 2/145* (2013.01); *H01M 2/1653* (2013.01); *H01M 10/052* (2013.01)

(58) Field of Classification Search
CPC ...... B05D 1/265; B05D 1/28; B05D 2201/02; B05D 2505/00; B05D 3/007; B05D 3/0254

USPC .............. 118/679, 688–691; 427/8–9
See application file for complete search history.

(56) References Cited

U.S. PATENT DOCUMENTS 6,447,958 B1 * 9/2002 Shinohara ............. H01M 2/145
                                               429/248
2007/0062447 A1 * 3/2007 Hayashi ............. G01B 11/0625
                                               118/713
2007/0248745 A1 * 10/2007 Wakai ................ B05C 11/1005
                                               427/10

(Continued)

FOREIGN PATENT DOCUMENTS

CN  104157847 A  11/2014
JP  S57099357 A   6/1982

(Continued)

OTHER PUBLICATIONS

Office Action dated May 29, 2020 in CN Application No. 201610921236.8.

(Continued)

*Primary Examiner* — Alexander M Weddle
(74) *Attorney, Agent, or Firm* — Panitch Schwarze Belisario & Nadel LLP

(57) ABSTRACT

A coating amount is adjusted based on a result of the inspecting step, then the coating amount is not adjusted during a standby period (Wt) which is a time taken to transfer the film from a coating section (21) to an inspecting section (26), and then the coating amount is adjusted based on the result of the inspecting step after the standby period has elapsed. With the configuration, an amount of a coating layer on a film base material is stabilized.

10 Claims, 14 Drawing Sheets

(56) References Cited

U.S. PATENT DOCUMENTS

2009/0004423 A1* 1/2009 Dietz .................. B32B 37/14
  428/41.8
2015/0194652 A1   7/2015 Okihiro et al.

FOREIGN PATENT DOCUMENTS

| | | | |
|---|---|---|---|
| JP | 11319666 A | | 11/1999 |
| JP | 2001180859 A | * | 7/2001 |
| JP | 2004167398 A | | 6/2004 |
| JP | 2008006322 A | * | 1/2008 |
| JP | 2009193906 A | | 8/2009 |
| JP | 2015065110 A | * | 4/2015 |
| JP | 2015-130270 A | | 7/2015 |
| SU | 882640 A1 | | 11/1981 |

OTHER PUBLICATIONS

Office Action dated Aug. 25, 2020 in JP Application No. 2016202981 (Partial English Translation).

* cited by examiner (a)

(b)

METHOD FOR PRODUCING FUNCTIONAL FILM, CONTROL DEVICE, AND CONTROL METHOD

This Nonprovisional application claims priority under 35 U.S.C. § 119 on Patent Application No. 2015-209334 filed in Japan on Oct. 23, 2015 and Patent Application No. 2016-202981 filed in Japan on Oct. 14, 2016, the entire contents of which are hereby incorporated by reference.

TECHNICAL FIELD

The present invention relates to production of a functional film, a control device for controlling the production of the functional film, and a control method for controlling the production of the functional film.

BACKGROUND ART

Patent Literature 1 discloses a technique in which a heat-resistant coating solution is applied to a film base material, and then a coated film is passed through a dryer so as to be dried, and thus a coating layer is formed.

Patent Literature 2 discloses a conventional technique in which a film thickness of a coating material which has been applied onto a film base material is measured, and a coating device is controlled based on the measurement result.

CITATION LIST

Patent Literature

[Patent Literature 1] Japanese Patent Application Publication Tokukai No. 2015-130270 (Publication date: Jul. 16, 2015)

[Patent Literature 2] Japanese Patent Application Publication Tokukaihei No. 11-319666 (Publication date: Nov. 24, 1999)

SUMMARY OF INVENTION

Technical Problem

The conventional techniques have a problem as follows: that is, in a case where a coating position and a measurement position of the film thickness of the coating material are not sufficiently close to each other in the production process, a change in film thickness of the coating material cannot be accurately reflected in a coating amount, and the film thickness of the coating material may not be stable.

An object of the present invention is to stabilize an amount of a coating layer on a film base material in a case where a coating material is applied to the film base material and the coating material is processed.

Solution to Problem

A method for producing a functional film in accordance with an embodiment of the present invention includes coating step of coating a film base material with a coating material in a coating section; processing step of processing an applied coating material in a processing section; and inspecting step of inspecting a film obtained by the coating step in an inspecting section, wherein a coating amount is adjusted based on a result of the inspecting step, then the coating amount is not adjusted during a standby period which is a time taken to transfer the film from the coating section to the inspecting section, and then the coating amount is adjusted based on a result of the inspecting step after the standby period has elapsed.

Advantageous Effects of Invention

According to the present invention, in a case where a coating material is applied to the film base material and the coating material is processed, it is possible to stabilize an amount of a coating layer on the film base material.

BRIEF DESCRIPTION OF DRAWINGS (a) of FIG. 1 is a schematic view illustrating a cross sectional configuration of a lithium ion secondary battery; and (b) through (d) of FIG. 1 are schematic views respectively illustrating stales under different conditions of the lithium ion secondary battery.

Figure 13:
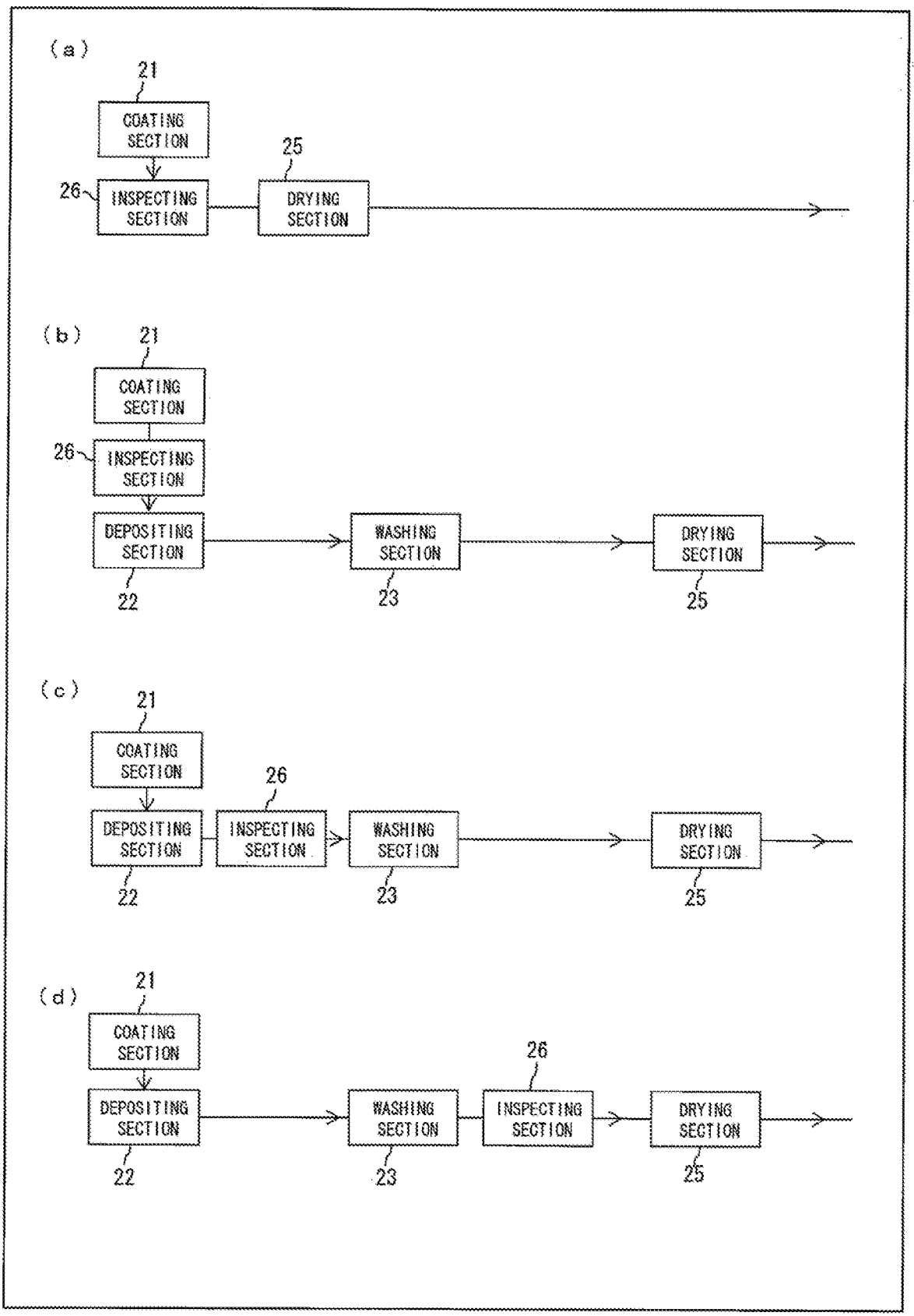

(a) of FIG. 13 is a schematic view illustrating another arrangement example of an inspecting section in Embodiment 1, and (b) through (d) of FIG. 13 are schematic views illustrating other arrangement examples of an inspecting section in Embodiments 2 and 3.

Figure 14:
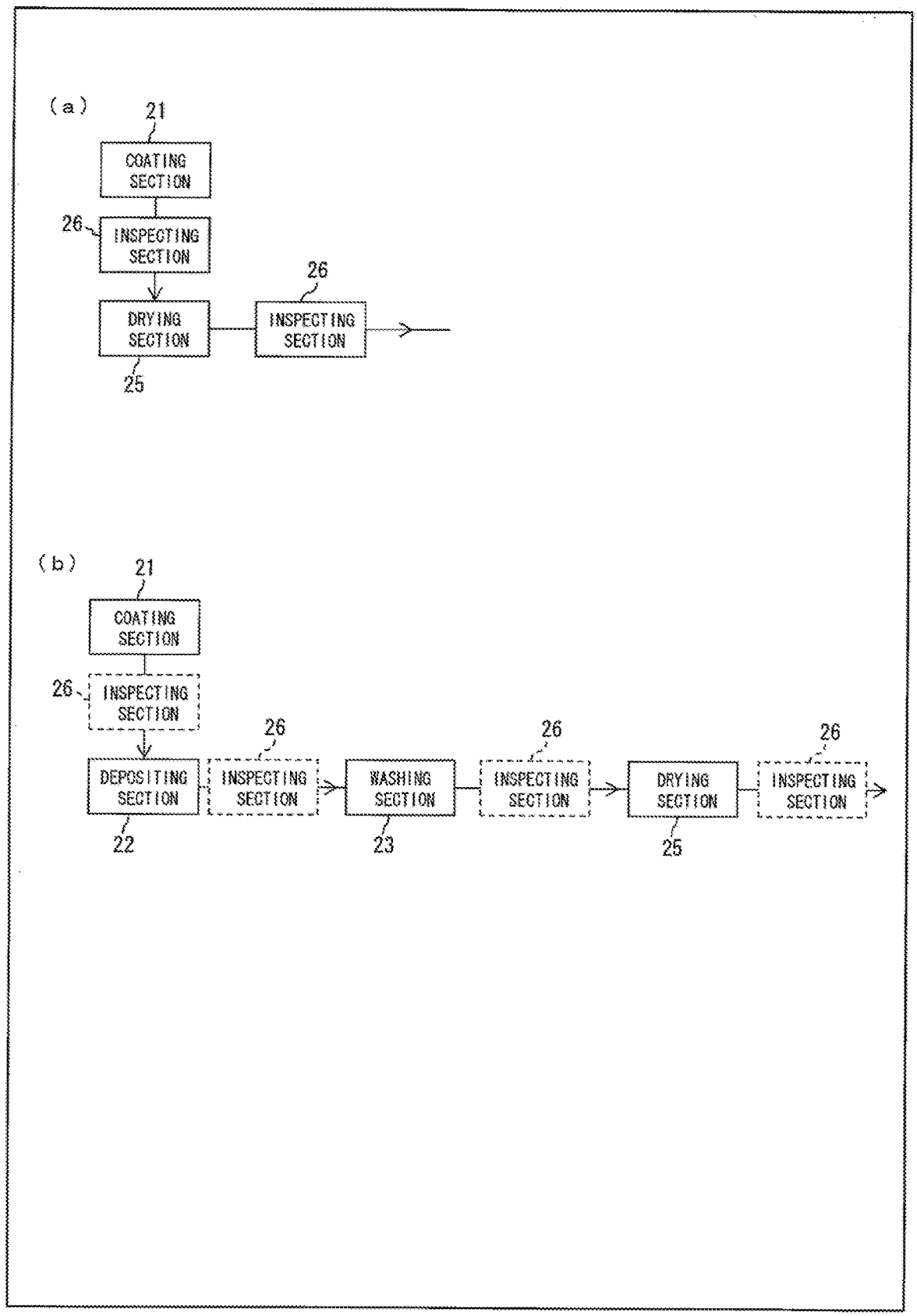

(a) of FIG. 14 is a schematic view illustrating another arrangement example of inspecting sections in Embodiment 1, and (b) of FIG. 14 is a schematic view illustrating still another arrangement example of inspecting sections in Embodiments 2 and 3.

DESCRIPTION OF EMBODIMENTS

The embodiments of the present invention will be discussed by taking, as an example, a separator film (may also be referred to as a separator) for lithium ion secondary batteries. Application of the present invention, however, is not limited to cases where a separator film for lithium ion secondary batteries is produced. The present invention is applicable to production of various functional films.

(Configuration of Lithium Ion Secondary Battery)

A nonaqueous electrolyte secondary battery typified by a lithium ion secondary battery has a high energy density. Thus, such a nonaqueous electrolyte secondary battery is currently widely used not only as a battery for use in (i) devices such as a personal computer, a mobile phone, and a mobile information terminal, and (ii) movable bodies such as an automobile and an airplane, but also as a stationary battery contributive to stable electric power supply.

Figure 1:
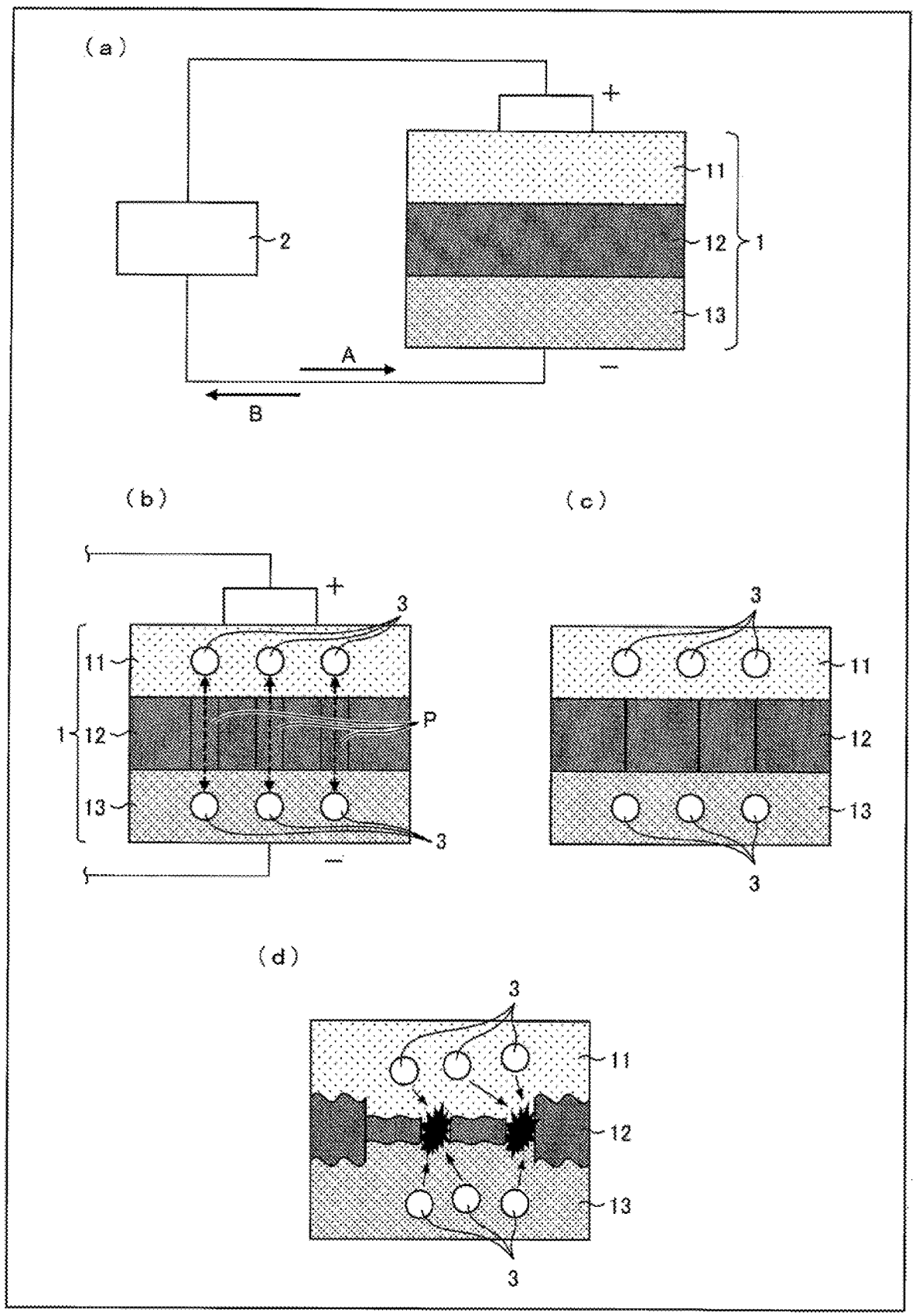

(a) of FIG. 1 is a schematic view illustrating a Configuration of a cross section of a lithium ion secondary battery 1.

As illustrated in (a) of FIG. 1, the lithium ion secondary battery 1 includes a cathode 11, a separator 12, and an anode 13. Between the cathode 11 and the anode 13, an external device 2 is connected outside the lithium ion secondary battery 1. While the lithium ion secondary battery 1 is being charged, electrons move in a direction A. Meanwhile, while the lithium ion secondary battery 1 is being discharged, electrons move in a direction B.

(Separator)

The separator 12 is provided so as to be sandwiched between the cathode 11, which serves as a positive electrode, and the anode 13, which serves as a negative electrode, of the lithium ion secondary battery 1. While separating the cathode 11 and the anode 13, the separator 12 allows lithium ions to move between the cathode 11 and the anode 13. The separator 12 contains, for example, polyolefin (e.g., polyethylene or polypropylene) as a material thereof.

(b) of FIG. 1 is a schematic view illustrating respective states under different conditions of the lithium ion secondary battery 1 illustrated in (a) of FIG. 1. (b) of FIG. 1 illustrates a state under a normal condition of the lithium ion secondary battery 1. (c) of FIG. 1 illustrates a state under a condition in which the lithium ion secondary battery 1 has increased in temperature. (d) of FIG. 1 illustrates a state under a condition in which the lithium ion secondary battery 1 has sharply increased in temperature.

As illustrated in (b) of FIG. 1, the separator 12 is provided with many pores P. Normally, lithium ions 3 in the lithium ion secondary battery 1 can move back and forth through the pores P.

Note here that there may be, for example, a case where the lithium ion secondary battery 1 increases in temperature due to, for example, overcharge of the lithium ion secondary battery 1 or a large current caused by a short circuit having occurred in the external device. In such a case, the separator 12 melts or softens, and the pores P are blocked (see (c) of FIG. 1). As a result, the separator 12 shrinks. This prevents the lithium ions 3 from moving back and forth, and consequently stops the increase in temperature (described earlier).

Note, however, that the separator 12 suddenly shrinks in a case where the lithium ion secondary battery 1 sharply increases in temperature. In this case, as illustrated in (d) of FIG. 1, the separator 12 may be broken. Then, the lithium ions 3 leak out from the separator 12 which has been broken, so that the lithium ions 3 do not stop moving back and forth. Thus, the increase in temperature continues.

(Heat-Resistant Separator)

Figure 2:
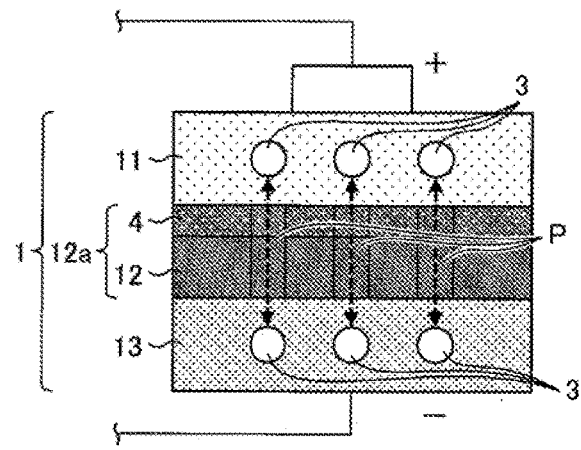
FIG. 2 is a schematic view illustrating respective states under different conditions of a lithium ion secondary battery having a configuration different from the configuration illustrated in FIG. 1.
Figure 2:
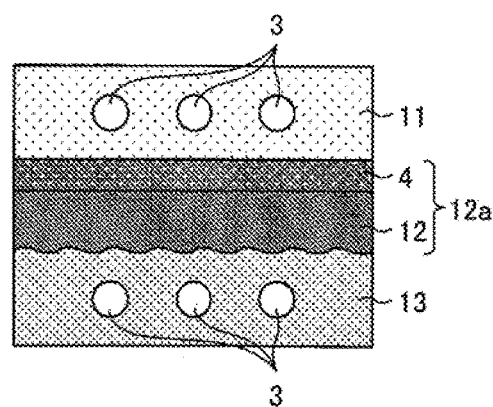

FIG. 2 is a schematic view illustrating respective states under different conditions of the lithium ion secondary battery 1 which has another configuration. (a) of FIG. 2 illustrates a state under a normal condition of the lithium ion secondary battery 1. (b) of FIG. 2 illustrates a state under a condition in which the lithium ion secondary battery 1 has sharply increased in temperature.

As illustrated in (a) of FIG. 2, the lithium ion secondary battery 1 can further include a heat-resistant layer 4. The heat-resistant layer 4 can be provided to the separator 12. (a) of FIG. 2 illustrates a configuration in which the heat-resistant layer 4, which serves as a functional layer, is provided to the separator 12. In the following description, as an example of a function-provided separator, a film in which the heat-resistant layer 4 is provided to the separator 12 is regarded as a heat-resistant separator 12a. Further, in the following description, the separator 12 of the function-provided separator is regarded as a base material with respect to the functional layer.

According to the configuration illustrated in (a) of FIG. 2, the heat-resistant layer 4 is laminated to one side of the separator 12 which one side faces the cathode 11. Alternatively, the heat-resistant layer 4 can be laminated to the other side of the separator 12 which other side faces the anode 13, or to both sides of the separator 12. Further, the heat-resistant layer 4 is provided with pores that are similar to the pores P. Normally, the lithium ions 3 move back and forth through the pores P and the pores of the heat-resistant layer 4. The heat-resistant layer 4 contains, for example, wholly aromatic polyamide (aramid resin) as a material thereof.

As illustrated in (b) of FIG. 2, even in a case where the lithium ion secondary battery 1 sharply increases in temperature and the separator 12 melts or softens, a shape of the separator 12, which is supported by the heat-resistant layer 4, is maintained. Thus, such a sharp increase in temperature merely results in melting or softening of the separator 12 and consequent blocking of the pores P. This stops the back-and-forth movement of the lithium ions 3 and consequently stops overdischarge or overcharge (described earlier). The separator 12 is thus prevented from being broken.

(Flow of Production of Function-Provided Separator)

The following description discusses a flow of production of a function-provided separator (functional film).

Figure 3:
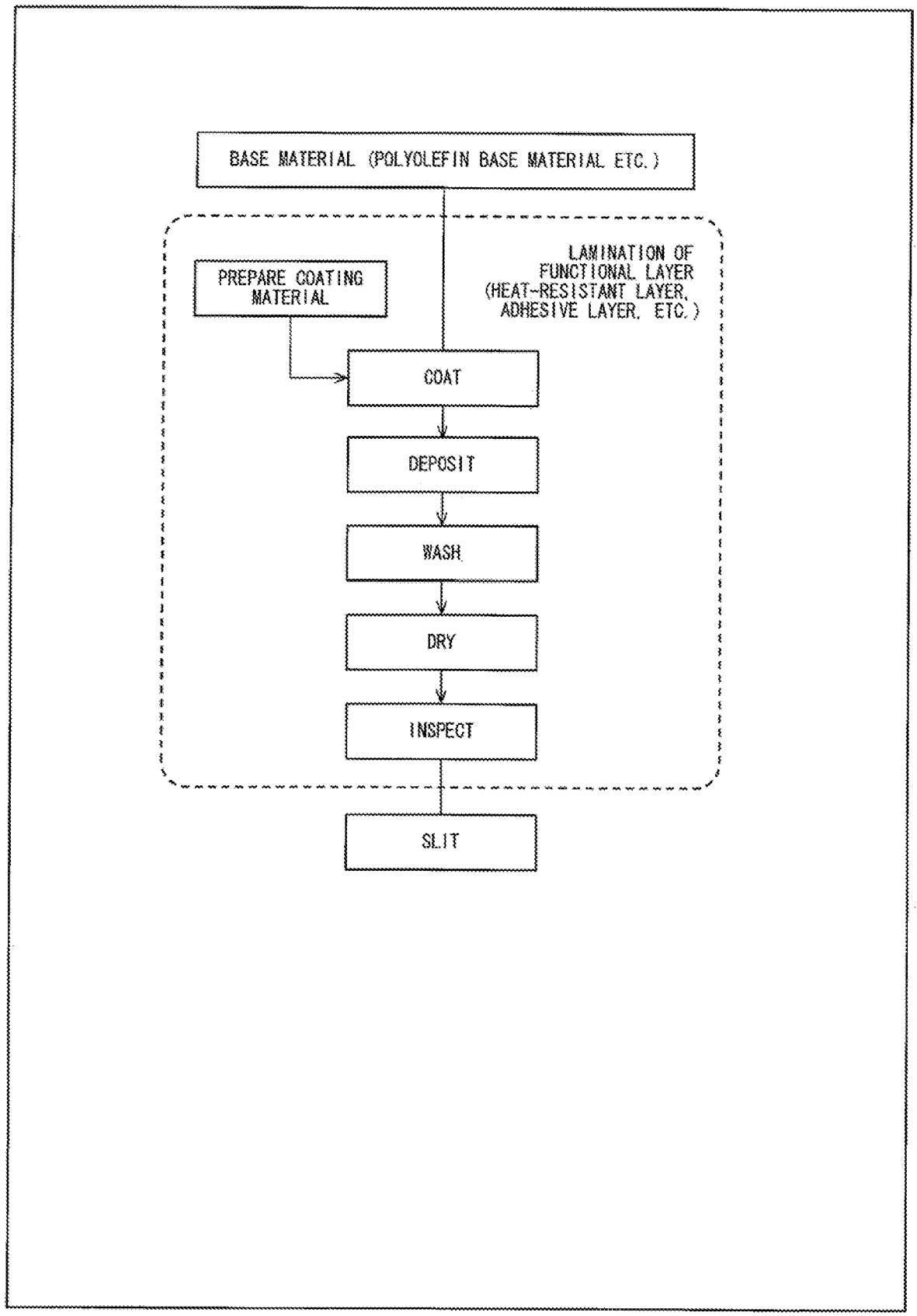
FIG. 3 is a flow diagram showing a production process of a functional film.

FIG. 3 is a flow diagram schematically showing a process for producing the function-provided separator.

The function-provided separator is configured to include a functional layer that is a coating layer and is laminated to a separator serving as a base material (film base material).

As the base material, a film made of, for example, polyolefin is used. The functional layer is exemplified by a heat-resistant layer and an adhesive layer.

The coating layer (functional layer) is laminated to the base material by coating the base material with a coating material that is suited to the functional layer, and drying the coated base material.

FIG. 3 illustrates a flow of production of a heat-resistant separator in a case where the functional layer is a heat-resistant layer. According to the illustrated flow, wholly aromatic polyamide (aramid resin), which is used as a material of which the heat-resistant layer is made, is laminated to a polyolefin base material.

This flow includes the steps of coating, deposition, washing, and drying. After lamination of the heat-resistant layer to the base material, a resultant film is subjected to inspection and subsequent slitting.

The following description discusses steps included in the process for producing the function-provided separator.

(Process for Producing Function-Provided Separator)

A process for producing a heat-resistant separator which includes, as the functional layer, a heat-resistant layer made of aramid resin includes the following steps (a) through (h).

Specifically, the process for producing the heat-resistant separator includes (a) a base material (separator) unwinding step, (b) a base material checking step, (c) a coating step of applying a coating material (functional material), (d) a deposition step carried out by, for example, humidification, (e) a washing step, (f) a drying step, (g) a coated article inspecting step, and (h) a winding step, which are carried out in this order. Meanwhile, the (b) base material checking step, the (d) deposition step carried out by, for example, humidification, and/or the (e) washing step can be omitted depending on a configuration of the functional layer.

Further, the process for producing the heat-resistant separator may include, in addition to the above steps (a) through (h), a base material producing (film-forming) step carried out before the (a) base material unwinding step, and/or a slitting step carried out after the (h) winding step.

The following description discusses the steps (a) through (h) in this order.

(a) Base Material Unwinding Step

The (a) base material unwinding step is a step of unwinding, from a roller, a separator original sheet film serving as the base material of the function-provided separator.

(b) Base Material Checking Step

The (b) base material checking step is a step of checking the unwound base material in advance of the subsequent coating step.

(c) Coating Step

The (c) coating step is a step of coating, with a coating material serving as the functional material, the base material which has been unwound in the step (a).

The following description discusses a method for laminating, to the base material, the heat-resistant layer serving as the functional layer. Specifically, the base material is coated with a coating material in which an inorganic filler such as alumina is dispersed in an NMP (N-methyl-pyrolidone) solution of aramid and which serves as a coating material for formation of the heat-resistant layer. Note that the heat-resistant layer is not limited to the above aramid heat-resistant layer. For example, the base material can be coated with a suspension containing an inorganic filler (e.g., a suspension containing alumina, carboxymethyl cellulose, and water), which serves as a coating material for formation of the heat-resistant layer.

A method for coating the base material with a coating material is not particularly limited provided that uniform wet coating can be carried out by the method. The method can be exemplified by various methods such as a capillary coating method, a slit die coating method, a spray coating method, a dip coating method, a roller coating method, a screen printing method, a flexo printing method, a gravure coater method, a bar coater method, and a die coater method.

The heat-resistant layer 4 has a thickness which can be controlled by adjusting a thickness of a coating material with which the base material is coated, adjusting a solid-content concentration that is represented by a sum of a binder concentration and a filler concentration in the coating material, and/or adjusting a ratio of the filler relative to the binder.

Note that the functional layer can be provided on only one side of the base material or on both sides of the base material.

(d) Deposition Step

The (d) deposition step is a step of solidifying the coating material with which the base material has been coated in the step (c). In a case where the coating material is an NMP solution of aramid, aramid is solidified by, for example, providing vapor to a coating surface and thereby causing humid deposition.

(e) Washing Step

The (e) washing step is a step of removing a solvent by washing the coating material having undergone the (d) deposition step. As a result of removal of the solvent, an aramid heat-resistant layer is formed on the base material. In a case where the heat-resistant layer is the aramid heat-resistant layer, water, an aqueous solution, or an alcoholic solution, for example is suitably used as a washing liquid.

(f) Drying Step

The (f) drying step is a step of drying the function-provided separator which has been washed in the step (e). In a case where the steps (d) and (e) are omitted, the coating material applied in the step (c) is dried in the (f) drying step.

A method for drying the function-provided separator is not particularly limited but can be various methods such as a method of bringing the function-provided separator into contact with a heated roller, and a method of blowing hot air on the function-provided separator.

In a case where a heat-resistant layer which contains an inorganic filler as a main component is formed, the heat-resistant layer is formed on the base material by (i) carrying out the drying step after applying a suspension (coating material) containing the inorganic filler and then (ii) removing a solvent.

(g) Inspecting Step

The (g) inspecting step is a step of measuring a physical quantity for obtaining an amount of the coating material on the film base material before a processing step or an amount of the coating layer on the film base material after the processing step. The processing step means any of the (d) deposition step, the (d) deposition step through the (e) washing step, the (d) deposition step through the (f) drying step, and the (f) drying step in the case where the steps (d) and (e) are omitted.

The measurement can be carried out with respect to the film including the base material or with respect to a part on the base material (i.e., a part of the film excluding the base material). The physical quantity to be measured is, for example, a weight per unit area or a thickness of the film, or a weight per unit area or a thickness of the part of the film excluding the film base material.

The (g) inspecting step can be carried out between the step (c) and the step (d), or between the step (d) and the step (e), or between the step (e) and the step (f), or after the step (f). In a case where the steps (d) and (e) are omitted, the (g) inspecting step can be carried out between the step (c) and the step (f) or after the step (f).

In a case where the step (g) is carried out between the steps (c) and (d), or in a case where the steps (d) and (e) are omitted and the step (g) is carried out between the steps (c) and (f), the film to be measured includes the base material and the coating material that has not been processed. In a case where the step (g) is carried out between the steps (d) and (e), the film to be measured includes the base material and the coating material (coating layer) which has been processed (solidified). In a case where the step (g) is carried out between the steps (e) and (f), the film to be measured includes, the base material, the coating material (coating layer) which has been processed (solidified), and a washing liquid. In a case where the step (g) is carried out after the step (f), the film to be measured includes the base material and the coating material (coating layer) which has been processed (i.e., after solidified and dried). The step (g) is preferably a step of inspecting the function-provided separator which has been dried.

The (g) inspecting step is preferably carried out between the steps (d) and (e), between the steps (e) and (f), or after the step (f). In a case where the step (g) is carried out at any of the above described timings, it is possible to advantageously prevent a problem that a measuring device is corroded in the (g) inspecting step by an organic solvent or the like contained in the coating material. Moreover, the above case is preferable because an error in the measurement may hardly occur because the coating material is solidified and accordingly the coated film is not ruffled due to vibration of a machine.

It is more preferable to carry out the (g) inspecting step after the processing step that includes the (d) deposition step through the (f) drying step. In such a case, it is possible to further stabilize an amount of the coating layer on the base material.

(h) Winding Step

The (h) winding step is a step of winding the function-provided separator which has been inspected.

The winding can be carried out by appropriately using, for example, a cylindrical core.

The wound function-provided separator can be, for example, directly shipped in the form of a wide original sheet. Alternatively, if necessary, the wound function-provided separator can be formed into a slit separator by being slit so as to have a narrow width such as a product width.

The following describes in detail individual steps in production of a function-provided separator (functional film, and for example, battery separator).

Embodiment 1

Figure 4:
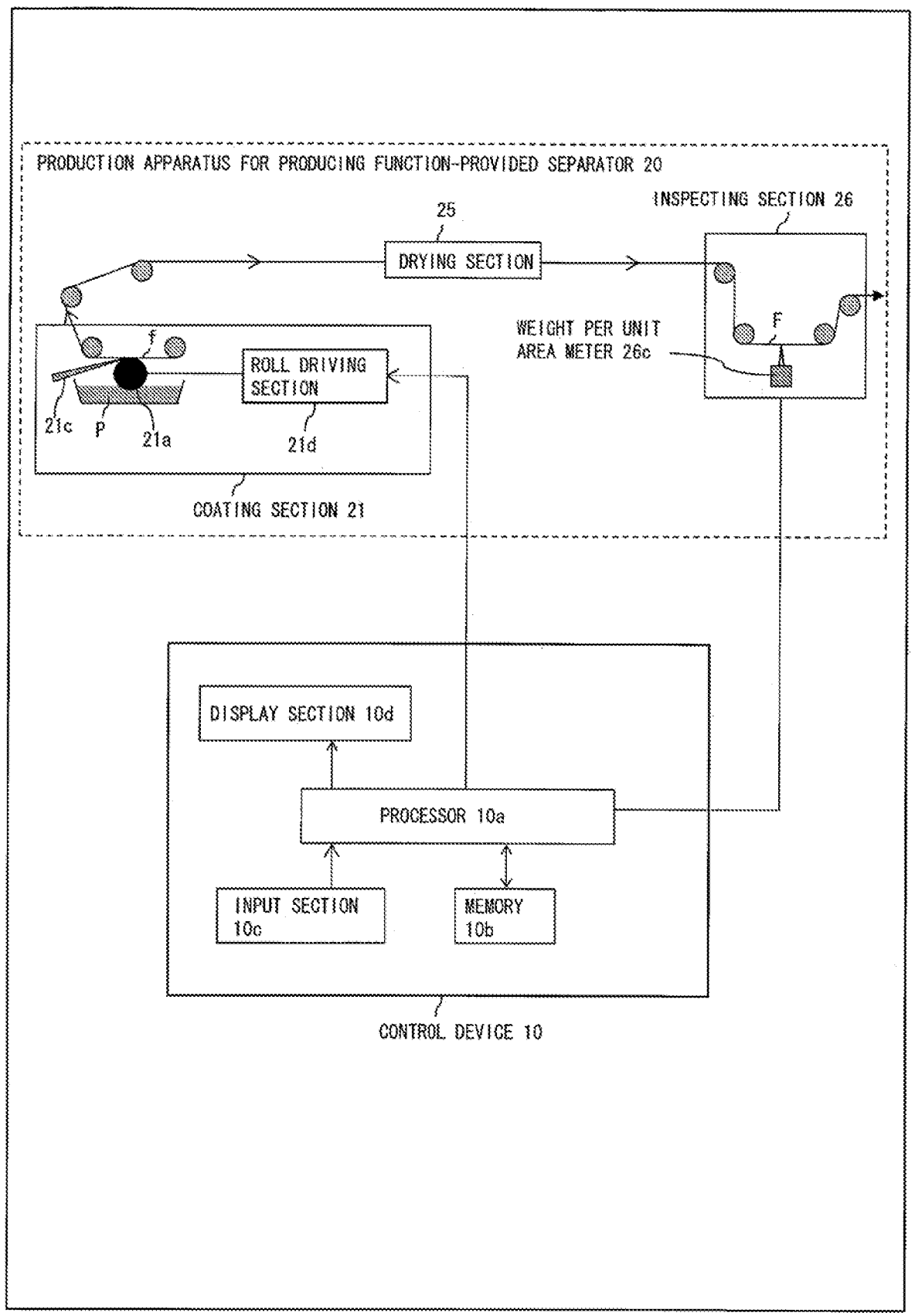
FIG. 4 is a schematic view illustrating configurations of a production apparatus for producing a functional film and a control device for controlling the production apparatus, in accordance with Embodiment 1.

FIG. 4 is a schematic view illustrating configurations of a production apparatus for producing a function-provided separator and a control device for controlling the production apparatus, in accordance with Embodiment 1. As illustrated in FIG. 4, a production apparatus 20 for producing a function-provided separator includes a coating section 21 for carrying out the (c) coating step, a drying section 25 for carrying out the (f) drying step, and an inspecting section 26 for carrying out the (g) inspecting step.

A control device 10 includes a processor 10a, a memory 10b for storing data necessary in processes carried out by the processor 10a, an input section 10c with which a user inputs necessary information (such as setting values), and a display section 10d for displaying information (such as setting values and a current status) which is necessary for the user. The control device 10 controls the production apparatus 20.

A film f is transferred to the inspecting section 26 as a film F via the coating section 21 and the drying section 25.

The coating section 21 has a mechanism of the gravure coater method, and includes a gravure roll 21a, a doctor blade 21c, and a roll driving section 21d. A coating material P used can be, for example, a suspension which contains alumina, carboxymethyl cellulose, and water.

In the mechanism, an upper end of the gravure roll 21a makes contact with the film f and a lower end of the gravure roll 21a is soaked in the coating material P. When the gravure roll 21a is rotated by the roll driving section 21d, the coating material in a recessed part provided in a surface of the gravure roll 21a is applied to the film f. Note that a redundant coating material on the surface of the gravure roll 21a is scraped off by the doctor blade 21c.

In Embodiment 1, the suspension containing alumina, carboxymethyl cellulose, and water is applied, and then the drying step is carried out so as to remove the solvent. Thus, the film F is obtained in which a heat-resistant layer is provided on the film f.

The inspecting section 26 includes a weight per unit area meter 26c. The weight per unit area meter 26c moves back and forth in a width direction on the film F which has been transferred from the drying section 25, and thus a weight per unit area (g/m$^2$) of the film F is measured. Note that, in a case where a film thickness is intended to be measured by the inspecting section 26, the inspecting section 26 can include a film thickness meter.

The roll driving section 21d causes the gravure roll 21a to rotate at a rotation ratio set in accordance with an instruction from the control device 10. Note that the rotation ratio means a ratio of a rotation speed of the gravure roll 21a relative to a transfer speed of the film.

The processor 10a of the control device 10 obtains a weight per unit area (here, current weight per unit area is represented by "PV") measured by the inspecting section 26 and calculates a rotation ratio (i.e., a rotation ratio of the roll driving section 21d) based on the current weight per unit area PV. Then, the processor 10a supplies a control signal corresponding to the rotation ratio thus calculated to the roll driving section 21d (i.e., feedback control), and thus adjusts a coating amount in the coating section 21.

Figure 5:
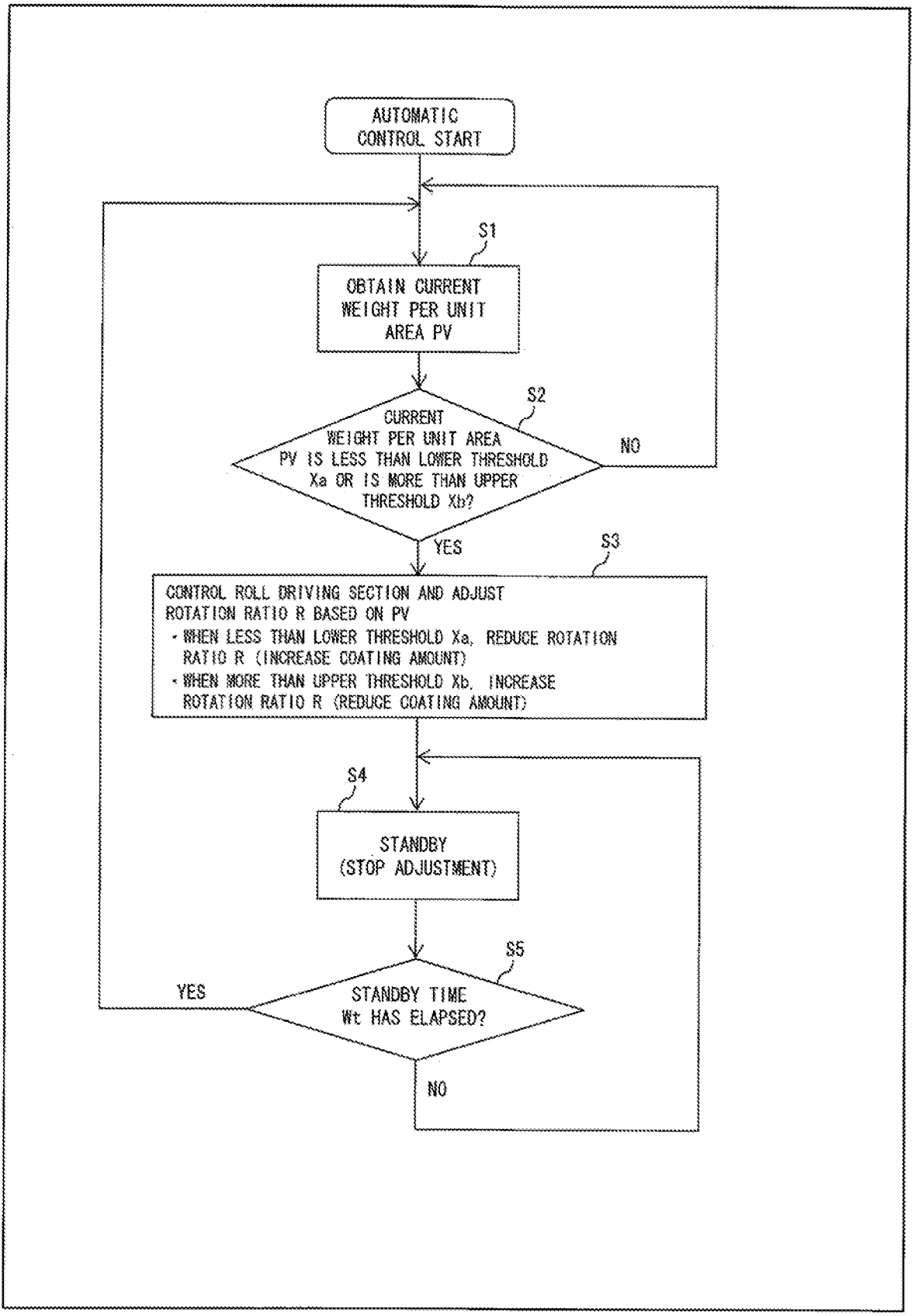
FIG. 5 is a flow diagram showing processing procedures of the control device in accordance with Embodiment 1.

FIG. 5 is a flow diagram showing an operating process of the processor 10a illustrated in FIG. 4. The processor 10a carries out operations by executing predetermined programs.

As illustrated in FIG. 5, when automatic control of a weight per unit area is started, the processor 10a obtains a current weight per unit area PV from the inspecting section 26 (step S1), and judges whether or not the current weight per unit area PV is less than a lower threshold Xa or is more than an upper threshold Xb (step S2).

The lower threshold Xa and the upper threshold Xb are determined, for example, as follows; Lower threshold Xa=reference weight per unit area (target value) Xc−tolerance Z; Upper threshold Xb=reference weight per unit area (target value) Xc+tolerance Z. The reference weight per unit area Xc and the tolerance Z can be, for example, values which have been inputted by the user with use of the input section 10c of the control device 10 and stored in the memory 10b.

In a case of NO in the step S2 (i.e., the current weight per unit area PV is within the lower threshold Xa and the upper threshold Xb), the process returns to the step S1. In a case of YES in the step S2, the process proceeds to the step S3, and the processor 10a controls the roll driving section 21d so as to adjust a rotation ratio R in accordance with the current weight per unit area PV.

Specifically, in a case where the current weight per unit area PV is less than the lower threshold Xa, the processor 10a reduces the rotation ratio R so as to increase the coating amount. Meanwhile, in a case where the current weight per unit area PV is more than the upper threshold Xb, the processor 10a increases the rotation ratio R so as to reduce the coating amount. Note that the rotation ratio and the coating amount are not in a linear relation and therefore, in a case where the rotation ratio is approximately 100 to 180, the coating amount is increased in accordance with increase in rotation ratio, and in a case where the rotation ratio is approximately 180 to 300, the coating amount decreases in accordance with increase in rotation ratio. In the step S3, the rotation ratio is assumed as approximately 180 to 300.

After the control of the roll driving section 21d in the step S3 is finished, the processor 10a stops controlling and waits (step S4). A standby time Wt is a time taken to transfer the film f from the coating section 21 (coating position) to the inspecting section 26 (inspecting position). The standby time Wt is determined based on "control standby distance (dead zone) L÷average transfer speed Va (from the coating section 21 to the inspecting section 26)". The control standby distance L can be, for example, a value which has been inputted by the user with use of the input section 10c of the control device 10 and stored in the memory 10b. In the coating step, the film is slightly stretched, and therefore it is preferable to consider the stretch when determining the control standby distance L.

Then, the processor 10a judges whether or not the standby time Wt has elapsed (step S5). In a case of YES in the step S5 (i.e., the standby period has elapsed), the process returns to the step S1. Meanwhile, in a case of NO in the step S5 (i.e., the standby period has not elapsed yet), the process returns to the step S4.

With the configuration, if is possible to ad just a coating amount after a previously adjusted coating amount is reflected in a result of measurement in the inspecting step. Therefore, even in a case where the coating step and the inspecting step are distant from each other as processes, it is possible to stabilize a weight per unit area.

Figure 6:
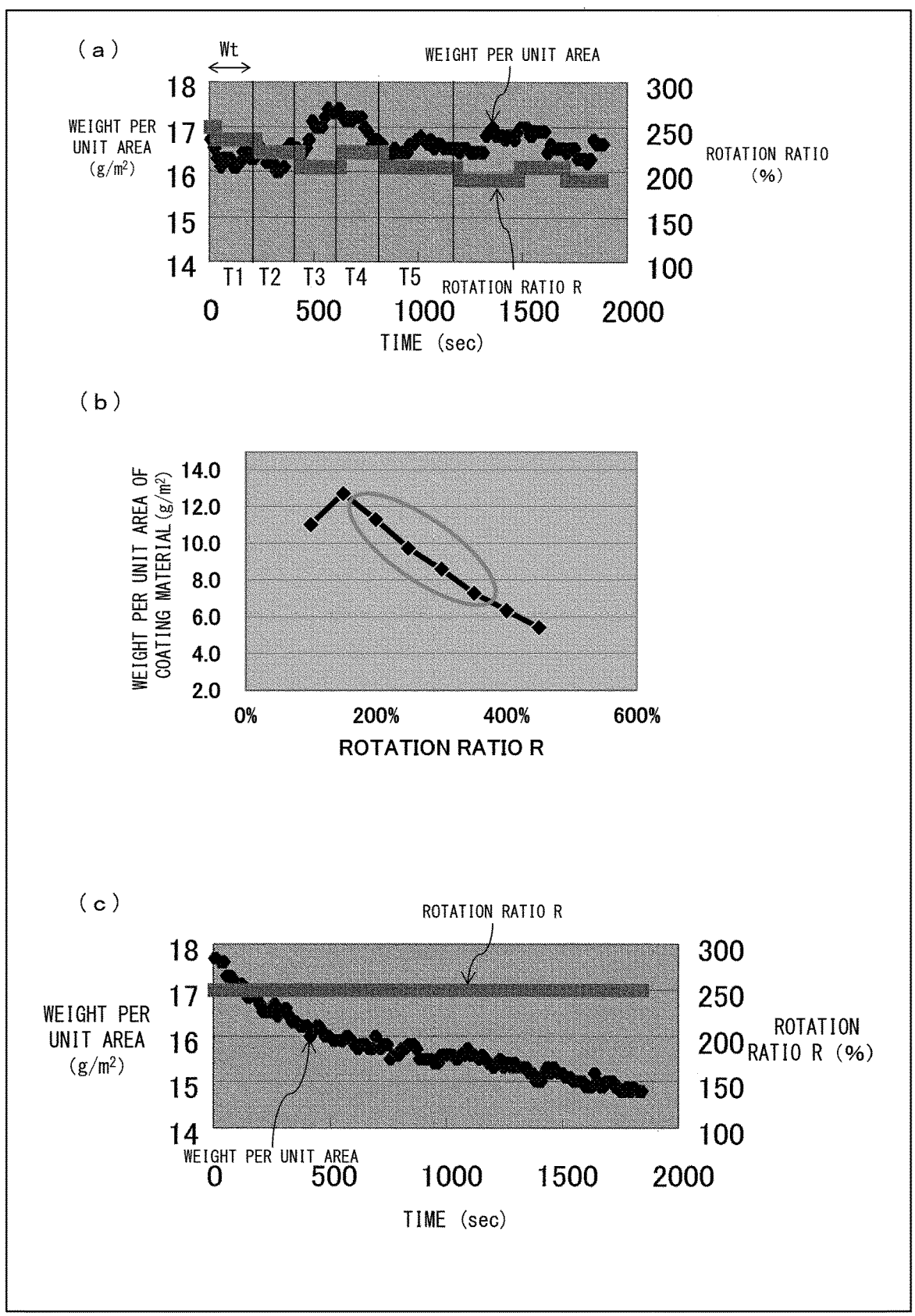
FIG. 6 is a graph showing results of the control device in accordance with Embodiment 1.

(a) of FIG. 6 is a graph showing changes in weight per unit area PV (entire film) and in rotation ratio R in a time series in a case where the control device 10 illustrated in FIG. 5 is used. (b) of FIG. 6 is a graph showing a relation between a weight per unit area of a coating material and a rotation ratio R. (c) of FIG. 6 is a graph showing changes in weight per unit area PV (entire film) and in rotation ratio R in a time series in a ease where the control device 10 is not used. In any of the cases shown in FIG. 6, the coating material P is a suspension containing alumina, carboxymethyl cellulose, and water.

As shown in (b) of FIG. 6, in a case where the rotation ratio is 180 to 300 as in (a) of FIG. 6, the weight per unit area of the coating material decreases, i.e., the coating amount decreases in accordance with increase in rotation ratio, and the weight per unit area of the coating material increases, i.e., the coating amount increases in accordance with decrease in rotation ratio.

As shown in (a) of FIG. 6, for example, at an end of a term T1 (i.e., end of standby period), the weight per unit area is less than the lower threshold Xa (approximately 16.5 g/m$^2$), and therefore the rotation ratio is reduced so as to increase the coating amount in a term T2. Moreover, at an end of a term T3 (i.e., end of standby period), the weight per unit area is more than the upper threshold Xb (approximately 17.0 g/m$^2$), and therefore the rotation ratio is increased so as to reduce the coating amount in a term T4. In a case where such control is carried out (as in (a) of FIG. 6), the weight per unit area is greatly stabilized (i.e., the weight per unit area mostly falls within a range between the lower threshold and the upper threshold), as compared with a case where such control is not carried out (as in (c) of FIG. 6).

Embodiment 2

Figure 7:
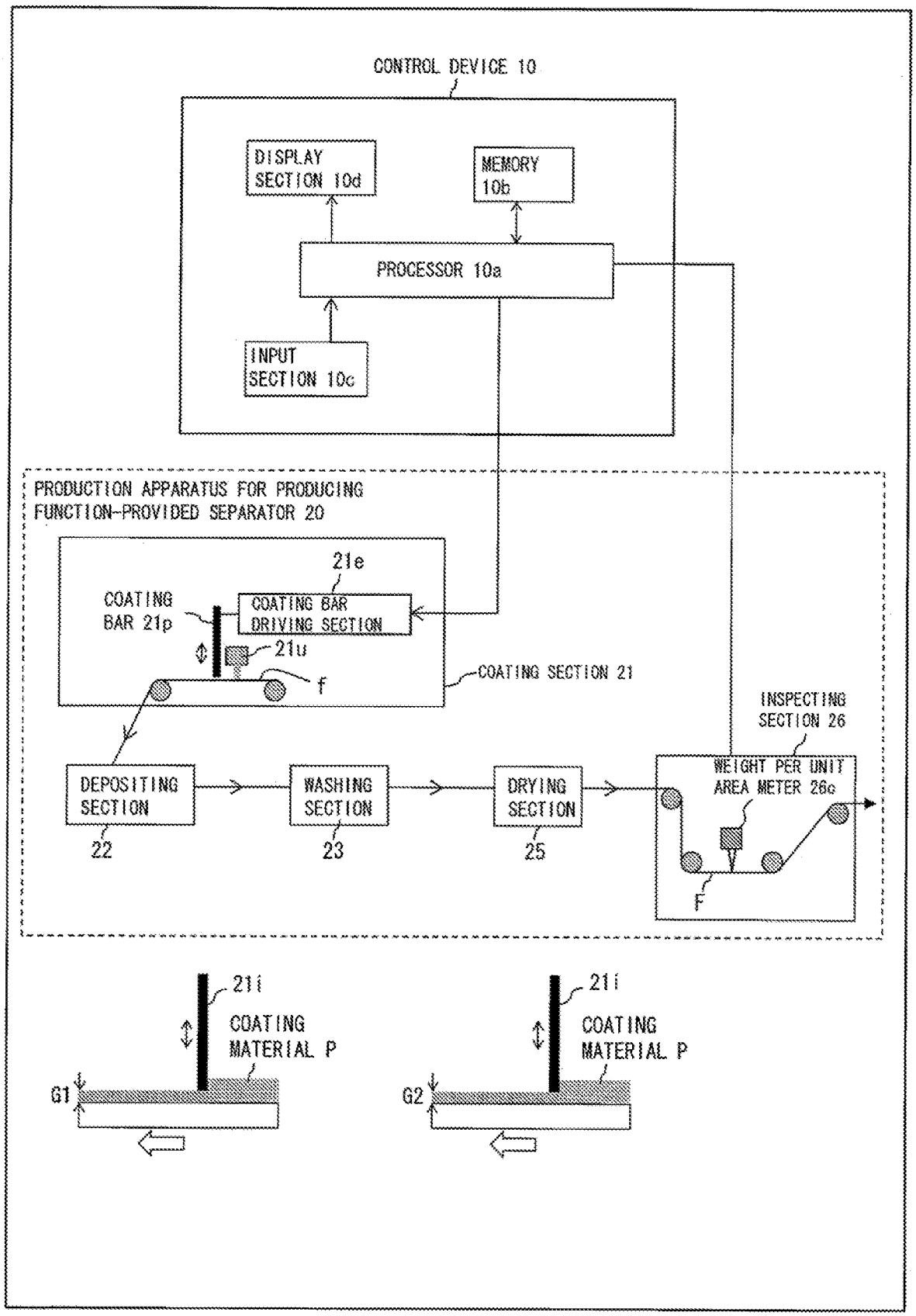
FIG. 7 is a schematic view illustrating configurations of a production apparatus for producing a functional film and a control device for controlling the production apparatus, in accordance with Embodiment 2.

FIG. 7 is a schematic view illustrating configurations of a production apparatus for producing a function-provided separator and a control device for controlling the production apparatus, in accordance with Embodiment 2. As illustrated in FIG. 7, a production apparatus 20 for producing a function-provided separator includes a coating section 21 for carrying out the (c) coating step, a depositing section 22 for carrying out the (d) deposition step, a washing section 23 for carrying out the (e) washing step, a drying section 25 for carrying out the (f) drying step, and an inspecting section 26 for carrying out the (g) inspecting step.

A control device 10 includes a processor 10a, a memory 10b for storing data necessary in processes carried out by the processor 10a, an input section 10c with which a user inputs necessary information (such as setting values), and a display section 10d for displaying information (such as setting values and a current status) which is necessary for the user. The control device 10 controls the production apparatus 20.

A film f is transferred to the inspecting section 26 as a film F via the coating section 21, the depositing section 22, the washing section 23, a water removing section, and the drying section 25.

The coating section 21 has a mechanism of the bar coater method, and includes a coating material dripping device 21u, a coating bar 21p, and a coating bar driving section 21e. The coating material can be, for example, an aramid solution.

In the mechanism, a gap (clearance) is provided between an edge of the coating bar 21p and the film f, and the film f is transferred while a coating material P dripped from the coating material dripping device 21u onto the film f is accumulated on one side (i.e., an upstream side in a transfer direction) of the coating bar 21p. Thus, the film f is coated.

The inspecting section 28 includes a weight per unit area meter 26c. The weight per unit area meter 26c moves back and forth in a width direction on the film F which has been transferred from the drying section 25, and thus a weight per unit area (g/m$^2$) of the film F is measured.

The coating bar driving section 21e causes the coating bar 21p to move up and down by an amount instructed by the control device 10. Note that, in FIG. 7, G1 indicates a gap between an edge of one side surface of the coating bar 21p and the film f, and G2 indicates a gap between an edge of the other surface of the coating bar 21p and the film f.

The processor 10a of the control device 10 obtains a weight per unit area (current weight per unit area PV) measured by the inspecting section 26 and calculates an up-down variation (i.e., an up-down movement amount of the coating bar 21p) based on the current weight per unit area PV. Then, the processor 10a supplies a control signal, which reflects the calculated up-down variation, to the coating bar driving section 21e (feedback control) so as to adjust the coating amount in the coating section 21.

Figure 8:
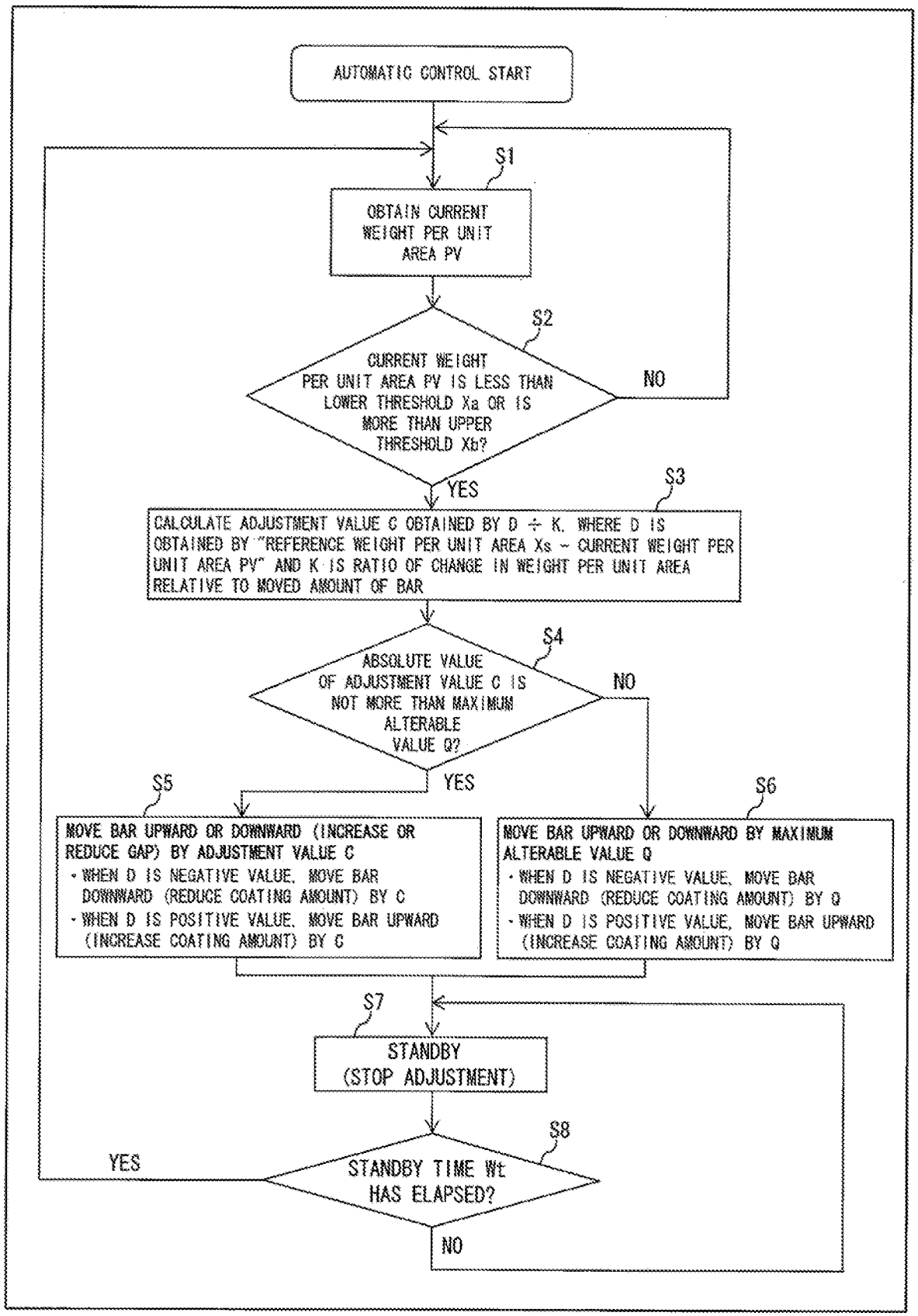
FIG. 8 is a flow diagram showing processing procedures of the control device in accordance with Embodiment 2.

FIG. 8 is a flow diagram showing an operating process of the processor 10a illustrated in FIG. 7. As illustrated in FIG. 8, when automatic control of a weight per unit area is started, the processor 10a obtains a current weight per unit area PV from the inspecting section 26 (step S1), and judges whether or not the current weight per unit area PV is less than a lower threshold Xa or is more than an upper threshold Xb (step S2).

The lower threshold Xa and the upper threshold Xb are determined, for example, as follows: Lower threshold Xa=reference weight per unit area (target value) Xc−tolerance Z; Upper threshold Xb=reference weight per unit area (target value) Xc+tolerance Z. The reference weight per unit area Xc and the tolerance Z can be, for example, values which have been inputted by the user with use of the input section 10c of the control device 10 and stored in the memory 10b.

In a case of NO in the step S2 (i.e., the current weight per unit area PV is within the lower threshold Xa and the upper threshold Xb), the process returns to the step S1. In a case of YES in the step S2, the process proceeds to the step S3 and an adjustment value C is calculated by D÷K, where D is obtained by "reference weight per unit area Xs−current weight per unit area PV" and K is a ratio of change in weight per unit area relative to a moved amount of the bar. The ratio K (i.e., a changed amount of weight per unit area when the coating bar is moved by 1 μm) can be, for example, a value which has been inputted by the user with use of the input section 10c of the control device 10 and stored in the memory 10b.

Next, in the step S4, the processor 10a judges whether or not an absolute value of the adjustment value C is not more than a maximum alterable value Q. In a case of YES in the step S4 (i.e., the absolute value of the adjustment value C is not more than the maximum alterable value Q), the process proceeds to the step S5 and the coating bar is moved upward or downward (i.e., the gap is increased or reduced) by a degree corresponding to the adjustment value C. Specifically, in a case where the value D is a negative value, the coating bar is moved downward by a degree corresponding to the adjustment value C (i.e., the coating amount is reduced). Meanwhile, in a case where the value D is a positive value, the coating bar is moved upward by a degree corresponding to the adjustment value C (i.e., the coating amount is increased). On the other hand, in a case of NO in the step S4 (i.e., the absolute value of the adjustment value C is more than the maximum alterable value Q), the process proceeds to a step S6 and the coating bar is moved upward or downward (i.e., the gap is increased or reduced) by a degree corresponding to the maximum alterable value Q. Specifically, in a case where the value D is a negative value, the coating bar is moved downward by a degree corresponding to the maximum alterable value Q (i.e., the coating amount is reduced). Meanwhile, in a case where the value D is a positive value, the coating bar is moved upward by a degree corresponding to the maximum alterable value Q (i.e., the coating amount is increased).

After the control of the coating bar driving section 21e in the steps S5 and S6 is finished, the processor 10a stops controlling and waits (step S7). A standby time Wt is a time taken to transfer the film f from the coating section 21 (coating position) to the inspecting section 26 (inspecting position). The standby time Wt is determined based on "control standby distance (dead zone) L÷average transfer speed Va (from the coating section 21 to the inspecting section 26)". The control standby distance L can be, for example, a value which has been inputted by the user with use of the input section 10c of the control device 10 and stored in the memory 10b.

Then, the processor 10a judges whether or not the standby time Wt has elapsed (step S8). In a case of YES in the step S8 (i.e., the standby period has elapsed), the process returns to the step S1. Meanwhile, in a case of NO in the step S8 (i.e., the standby period has not elapsed yet), the process returns to the step S7.

With the configuration, it is possible to adjust a coating amount after a previously adjusted coating amount is reflected in a result of measurement in the inspecting step. Therefore, even in a case where the coating step and the inspecting step are distant from each other as processes, it is possible to stabilize a weight per unit area.

Figure 9:
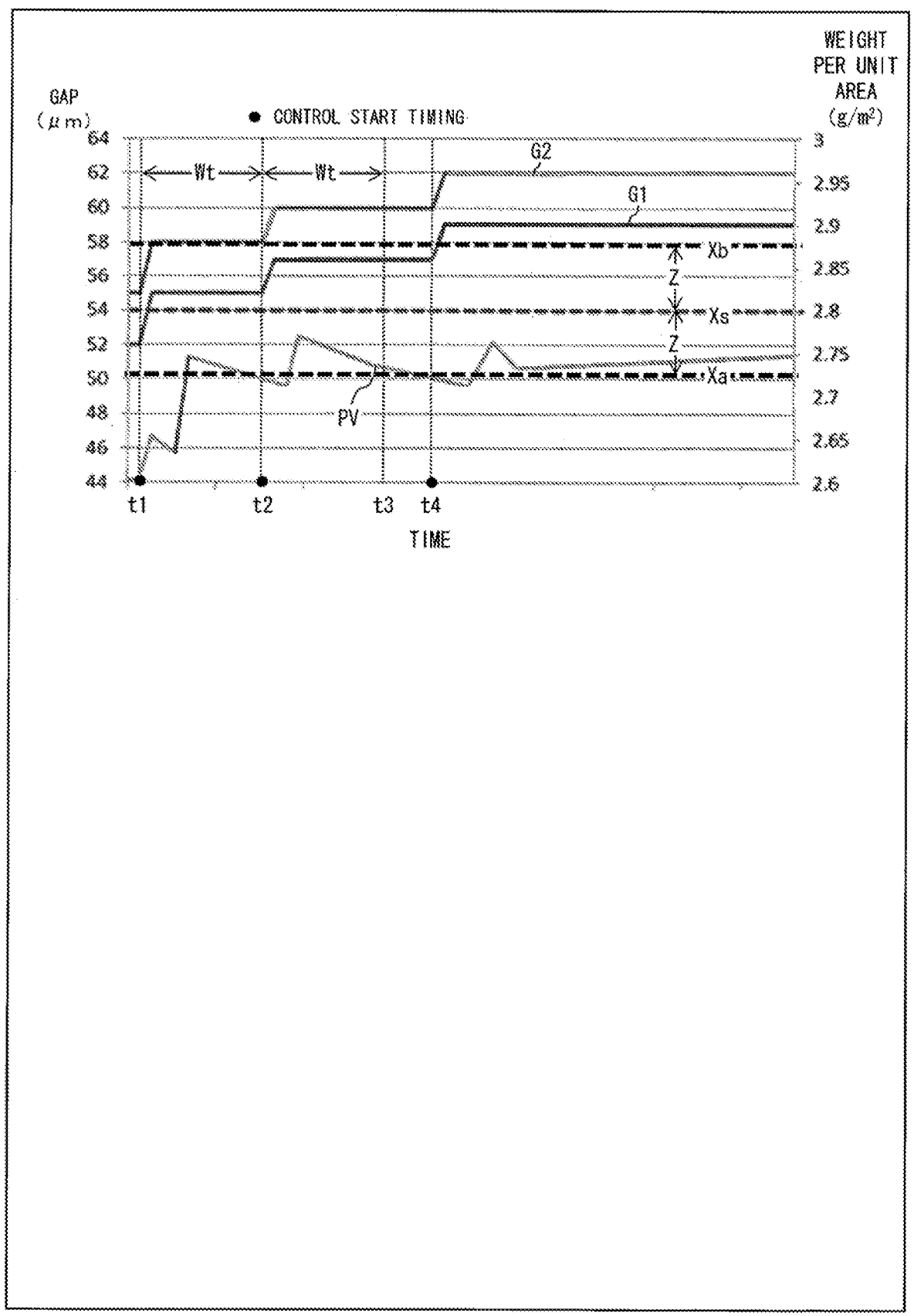
FIG. 9 is a graph showing an effect of the control device in accordance with Embodiment 2.

FIG. 9 is a graph showing, in a time series, a change in weight per unit area PV (entire film) and changes in gaps G1 and G2 obtained by the coating bar in a case where the control device 10 is used. In FIG. 9, an aramid solution is used as the coating material P.

Here, the reference weight per unit area (target value) Xc is approximately 2.8 (g/m$^2$), the lower threshold Xa is approximately 2.73 (g/m$^2$), the upper threshold Xb is approximately 2.87 (g/m$^2$), and the tolerance Z is 0.07 (g/m$^2$). Moreover, the edge (tip) of the coating bar is inclined by setting the gap G1 to 52 (μm) and the gap G2 to 55 (μm) at a time point t1.

As shown in FIG. 9, for example, at the time point t1, the weight per unit area PV is lower than the lower threshold Xa, and therefore the coating bar is moved upward (i.e., the gaps G1 and G2 are increased by 3 μm) so as to increase the coating amount. At a time point t2 at which a standby time Wt has elapsed from the time point t1 also, the weight per unit area PV is lower than the lower threshold Xa, and therefore the coating bar is further moved upward (i.e., the gaps G1 and G2 are increased by 3 μm) so as to increase the coating amount. At a time point t3 at which a standby time Wt has elapsed from the time point t2, the weight per unit area PV is not lower than the lower threshold Xa, and therefore the coating bar is not adjusted. After that, the weight per unit area PV becomes lower than the lower threshold Xa at a time point t4, and therefore the coating bar is further moved upward (i.e., the gaps G1 and G2 are increased by 3 μm) so as to increase the coating amount.

With the adjustment above, after the time point t4, the weight per unit area PV is stabilized (i.e., more than the lower threshold Xa).

Figure 10:
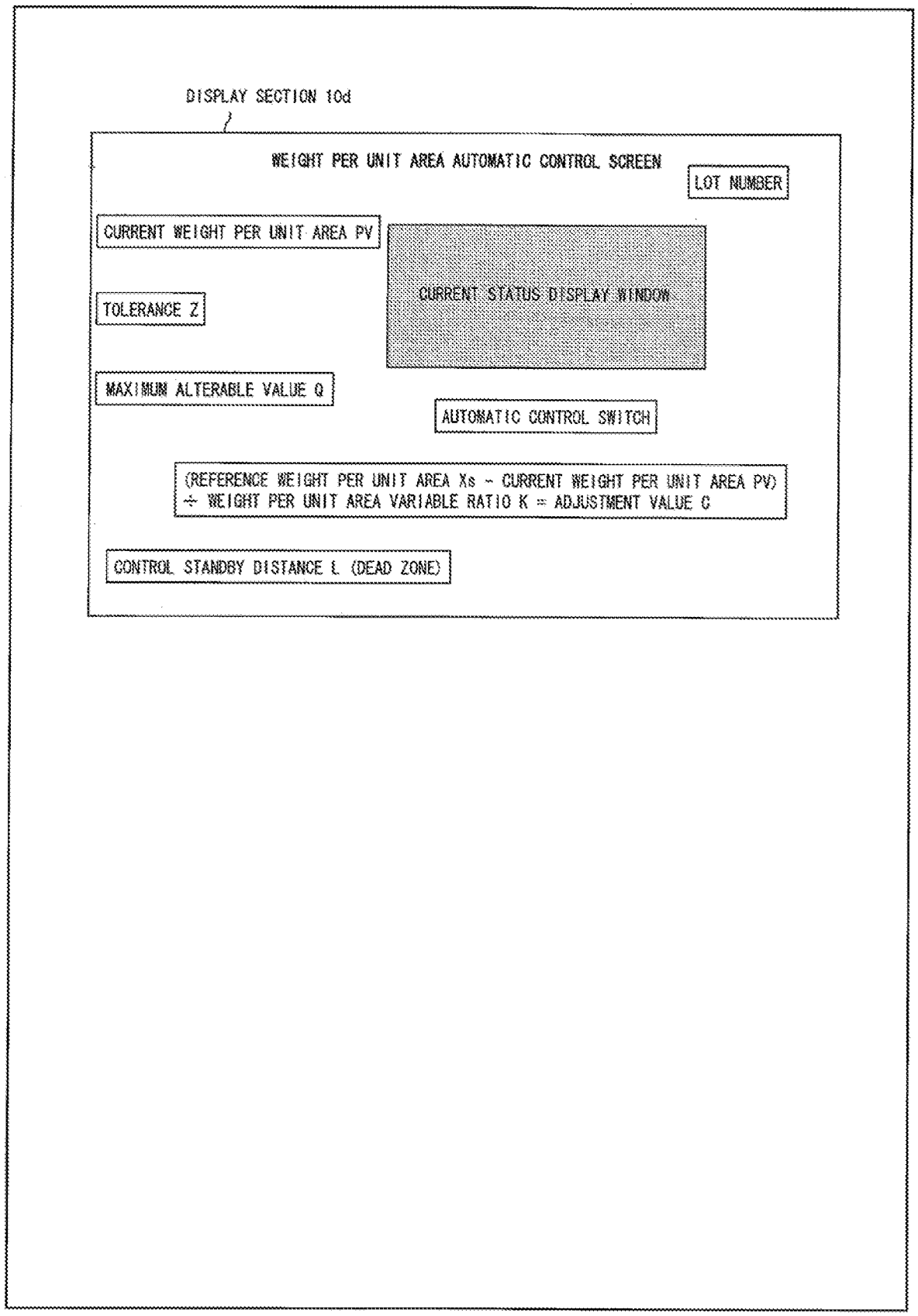
FIG. 10 is a schematic view illustrating an example of a display section of the control device in accordance with Embodiment 2.

FIG. 10 illustrates an example of the display section 10d of the control device 10 illustrated in FIG. 7. As illustrated in FIG. 10, the display section 10d displays the current weight per unit area PV, the tolerance Z, the maximum alterable value Q, a formula representing (reference weight per unit area Xs−current weight per unit area PV)÷weight per unit area variable ratio K=adjustment value C (see the step S3 in FIG. 8), the control standby distance L (dead zone), a lot number, an icon of an automatic control switch, and a current status display window.

Embodiment 3

Figure 11:
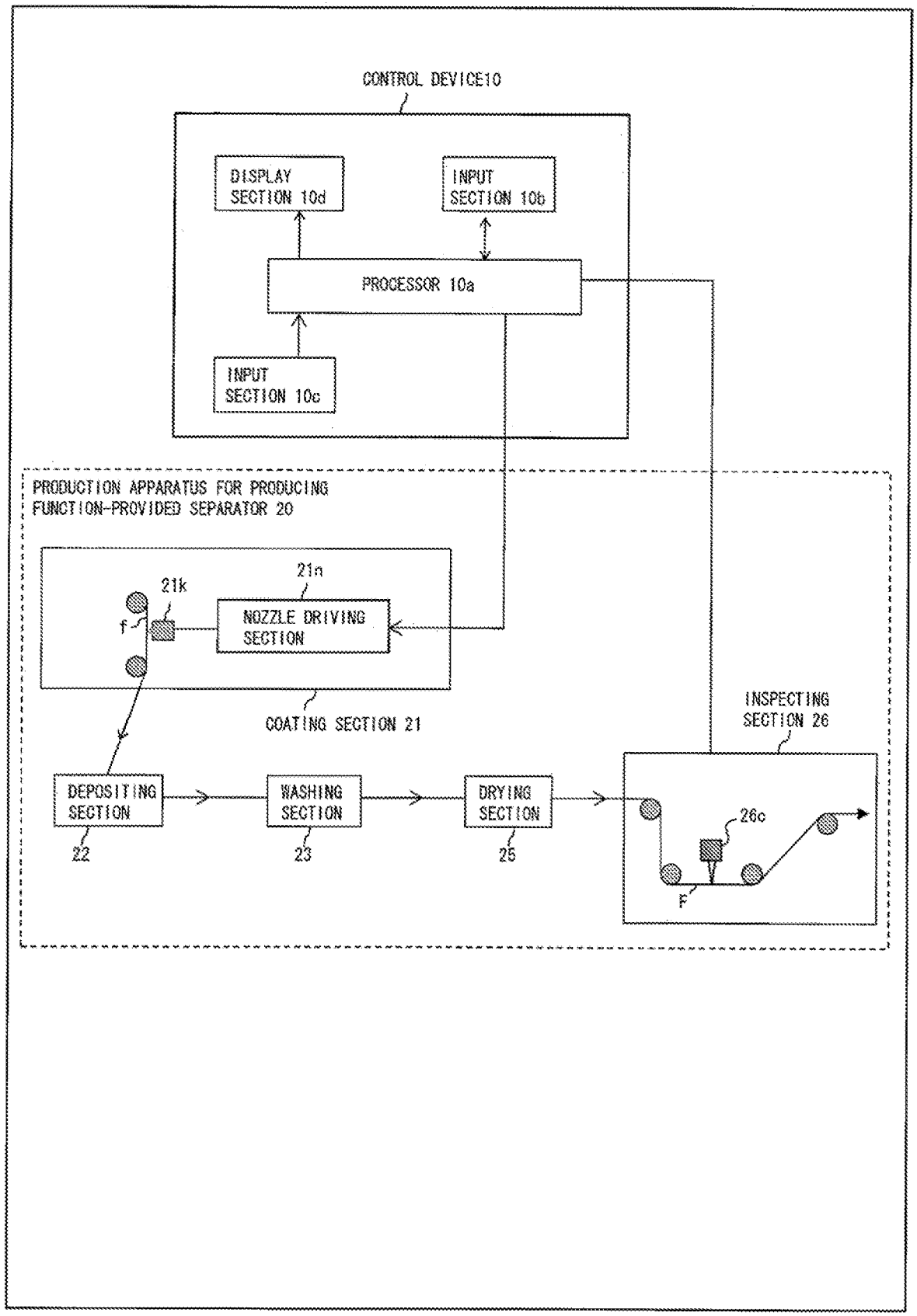
FIG. 11 is a schematic view illustrating configurations of a production apparatus for producing a functional film and a control device for controlling the production apparatus, in accordance with Embodiment 3.

FIG. 11 is a schematic view illustrating configurations of a production apparatus for producing a function-provided separator and a control device for controlling the production apparatus, in accordance with Embodiment 3. As illustrated in FIG. 11, a production apparatus 20 for producing a function-provided separator includes a coating section 21 for carrying out the (c) coating step, a depositing section 22 for carrying out the (d) deposition step, a washing section 23 for carrying out the (e) washing step, a drying section 25 for carrying out the (f) drying step, and an inspecting section 26 for carrying out the (g) inspecting step.

A control device 10 includes a processor 10a, a memory 10b for storing data necessary in processes carried out by the processor 10a, an input section 10c with which a user inputs necessary information (such as setting values), and a display section 10d for displaying information (such as setting values and a current status) which is necessary for the user. The control device 10 controls the production apparatus 20.

A film f is transferred to the inspecting section 26 as a film F via the coating section 21, the depositing section 22, the washing section 23, and the drying section 25.

The coating section 21 has a mechanism of a die coater method and includes a nozzle 21k and a nozzle driving section 21n. With the mechanism, a coating material is supplied from the nozzle 21k to the film f which is being transferred, and thus the film f is coated.

The inspecting section 26 includes a weight per unit area meter 26c. The weight per unit area meter 26c moves back and forth in a width direction on the film F which has been transferred from the drying section 25, and thus a weight per unit area (g/m$^2$) of the film F is measured.

The nozzle driving section 21n drives the nozzle 21k so that a supplied liquid amount corresponds to an instruction given from the control device 10.

The processor 10a of the control device 10 obtains a weight per unit area (current weight per unit area PV) measured by the inspecting section 26 and calculates a supplied liquid amount (i.e., an amount of liquid supplied via the nozzle 21k) based on the current weight per unit area PV. Then, the processor 10a supplies a control signal, which reflects the calculated supplied liquid amount, to the nozzle driving section 21n (feedback control) so as to adjust the coating amount in the coating section 21.

Figure 12:
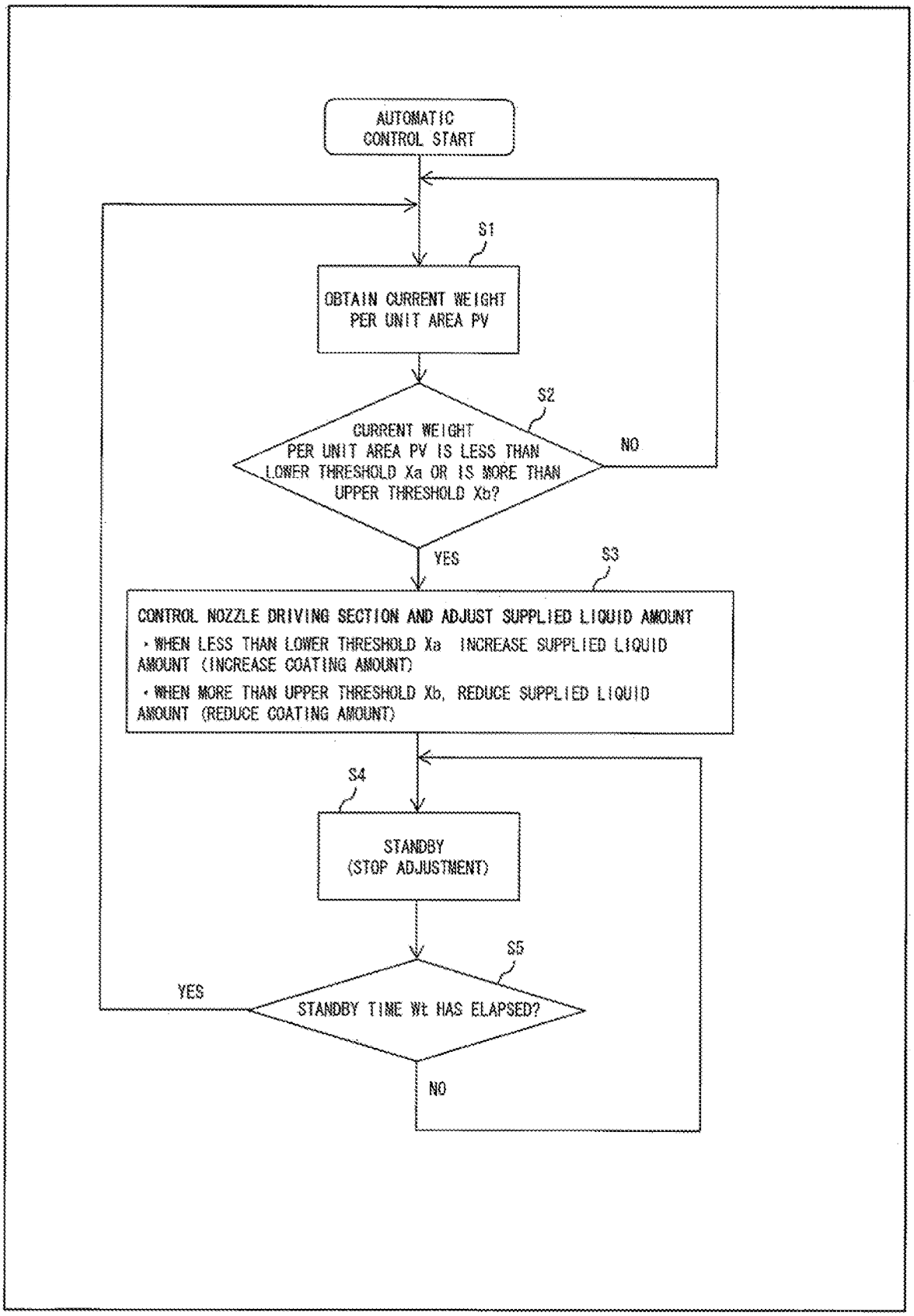
FIG. 12 is a flow diagram showing processing procedures of the control device in accordance with Embodiment 3.

FIG. 12 is a flow diagram showing an operating process of the processor illustrated in FIG. 4. As illustrated in FIG. 12, when automatic control of a weight per unit area is started, the processor 10a obtains a current weight per unit area PV from the inspecting section 26 (step S1), and judges whether or not the current weight per unit area PV is less than a lower threshold Xa, or is more than an upper threshold Xb (step S2).

The lower threshold Xa and the upper threshold Xb are determined, for example, as follows: Lower threshold Xa=reference weight per unit area (target value) Xc−tolerance Z; Upper threshold Xb=reference weight per unit area (target value) Xc+tolerance Z. The reference weight per unit area Xc and the tolerance Z can be, for example, values which have been inputted by the user with use of the input section 10c of the control device 10 and stored in the memory 10b.

In a case of NO in the step S2 (i.e., the current weight per unit area PV is within the lower threshold Xa and the upper threshold Xb), the process returns to the step S1. In a case of YES in the step S2, the process proceeds to the step S3, and the processor 10a controls the nozzle driving section 21n so as to adjust the supplied liquid amount to a value based on the current weight per unit area PV.

Specifically, in a case where the current weight per unit area PV is lower than the lower threshold Xa, the supplied liquid amount is increased so as to increase the coating amount. Meanwhile, in a case where the current weight per unit area PV is more than the upper threshold Xb, the supplied liquid amount is reduced so as to reduce the coating amount.

After the control of the nozzle driving section 21n in the steps S3 is finished, the processor 10a stops controlling and waits (step S4). A standby time Wt is a time taken to transfer the film f from the coating section 21 (coating position) to the inspecting section 26 (inspecting position). The standby time Wt is determined based on "control standby distance (dead zone) L÷average transfer speed Va (from the coating section 21 to the inspecting section 26)". The control standby distance L can be, for example, a value which has been inputted by the user with use of the input section 10c of the control device 10 and stored in the memory 10b.

Then, the processor 10a judges whether or not the standby time Wt has elapsed (step S5). In a case of YES in the step S5 (i.e., the standby period has elapsed), the process returns to the step S1. Meanwhile, in a case of NO in the step S5 (i.e., the standby period has not elapsed yet), the process returns to the step S4.

Regarding Embodiments 1 Through 3

In Embodiments 1 through 3, the control device 10 and the production apparatus 20 are separated from each other. Note, however, that Embodiments 1 through 3 are not limited to this. That is, the control device 10 can be included in the production apparatus 20.

Moreover, in Embodiments 1 through 3, the control device 10 is configured in a software form. Note, however, that Embodiments 1 through 3 are not limited to this, and the control device 10 can be configured in a hardware form.

In Embodiment 1, as illustrated in (a) of FIG. 13, the inspecting section 26 can be provided between the coating section 21 and the drying section 25. Alternatively, as illustrated in (a) of FIG. 14, it is possible to employ a configuration in which an inspecting section 26 is provided between the coating section 21 and the drying section 25 and another inspecting section 26 is provided behind (downstream of) the drying section 25, and the coating amount is adjusted based on an inspection result obtained by at least one of these inspecting sections 26.

In Embodiments 2 and 3, the inspecting section 26 can be provided between the coating section 21 and the depositing section 22 (see (b) of FIG. 13), or the inspecting section 26 can be provided between the depositing section 22 and the washing section 23 (see (c) of FIG. 13), or the inspecting section 26 can be provided between the washing section 23 and the drying section 25 (see (d) of FIG. 13). Alternatively, it is possible to employ a configuration in which a plurality of inspecting sections 26 are provided at respective of a plurality of positions (i.e., 2 to 4 positions) selected from positions between the coating section 21 and the depositing section 22, between the depositing section 22 and the washing section 23, between the washing section 23 and the drying section 25, and behind (downstream of) the drying section 25, and the coating amount is adjusted based on an inspection result obtained by at least one of the plurality of inspecting sections 26 (see (b) of FIG. 14).

[Main Points]

The method for producing a functional film in accordance with an embodiment of the present invention includes coating step of coating a film base material with a coating material in a coating section; processing step of processing an applied coating material in a processing section; and inspecting step of inspecting a film obtained by the coating step in an inspecting section, wherein a coating amount is adjusted based on a result of the inspecting step, then the coating amount is not adjusted during a standby period which is a time taken to transfer the film from the coating section to the inspecting section, and then the coating amount is adjusted based on a result of the inspecting step after the standby period has elapsed.

For example, the method for producing a functional film includes the steps of: coating a film (base material) with a coating material in a coating section; processing, in a processing section, the coating material which has been applied to the film (base material); and inspecting a weight per unit area of the coated film in an inspecting section. After a coating amount is adjusted based on a result of measurement carried out in the inspecting step, the coating amount is not adjusted during a standby period which is a time taken to transfer the film from the coating section to the inspecting section, and then the coating amount is adjusted based on the result of the inspecting step after the standby period has elapsed.

As such, according to the configuration in which, after a coating amount is adjusted, the coating amount is not adjusted during a standby period which is a time taken to transfer the film from the coating section to the inspecting section, and then the coating amount is adjusted based on the result of measurement in the inspecting step after the standby period has elapsed, it is possible to adjust a coating amount after a previously adjusted coating amount is reflected in a result of measurement in the inspecting step. Therefore, even in a case where the coating step and the inspecting step are distant from each other as processes, it is possible to stabilize an amount of the coating layer on the base material.

According to the functional film production method in accordance with an embodiment of the present invention, in the inspecting step, a physical quantity is measured for obtaining an amount of the coating material on the film base material before the processing step or for obtaining an amount of a coating layer on the film base material after the processing step.

According to the functional film production method in accordance with an embodiment of the present invention, in a case where the physical quantity which has been measured crosses a threshold, the coating amount is adjusted.

According to the functional film production method in accordance with an embodiment of the present invention, in a case where a difference between the physical quantity which has been measured and a criterion value of the physical quantity is greater than a tolerance, the coating amount is changed by an adjustment value that is obtained by dividing the difference by a ratio of a change in physical quantity relative to a change in coating amount.

According to the functional film production method in accordance with an embodiment of the present invention, in a case where the adjustment value is greater than a predetermined value, the coating amount is changed by the predetermined value.

According to the functional film production method in accordance with an embodiment of the present invention, the physical quantity is a weight per unit area or a thickness of the film; or the physical quantity is a weight per unit area or a thickness of a part of the film excluding the film base material.

According to the functional film production method in accordance with an embodiment of the present invention, the inspecting step is carried out after the processing step.

According to the functional film production method in accordance with an embodiment of the present invention, the processing step includes drying the coating material in the film.

According to the functional film production method in accordance with an embodiment of the present invention, the coating step is carried out with a gravure coater method; and the coating amount corresponds to a rotation ratio of a gravure roll.

According to the functional film production method in accordance with an embodiment of the present invention, the coating step is carried out with a bar coater method; and the coating amount corresponds to an amount of a gap between a coating bar and the film.

According to the functional film production method in accordance with an embodiment of the present invention, the coating step is carried out with a die coater method; and the coating amount corresponds to a supplied liquid amount from a nozzle.

According to the functional film production method in accordance with an embodiment of the present invention, the functional film is a battery separator.

The control device in accordance with an embodiment of the present invention is a control device for controlling a production apparatus for producing a functional film, in which: the production apparatus includes (i) a coating section for coating a film base material with a coating material, (ii) a processing section for processing the coating material which has been applied, and (iii) an inspecting section for inspecting a film which has been coated; and a coating amount is adjusted based on a result of inspection carried out by the inspecting section, then the coating amount is not adjusted during a standby period which is a time taken to transfer the film from the coating section to the inspecting section, and then the coating amount is adjusted based on the result of inspection carried out by the inspecting section after the standby period has elapsed.

The control method in accordance with an embodiment of the present invention is a control method for controlling a production apparatus for producing a functional film, in which: the production apparatus includes (i) a coating section for coating a film base material with a coating material, (ii) a processing section for processing the coating material which has been applied, and (iii) an inspecting section for inspecting a film which has been coated; and a coating amount is adjusted based on a result of inspection carried out by the inspecting section, then the coating amount is not adjusted during a standby period which is a time taken to transfer the film from the coating section to the inspecting section, and then the coating amount is adjusted based on the result of inspection carried out by the inspecting section after the standby period has elapsed.

REFERENCE SIGNS LIST

1: Lithium ion secondary battery
4: Heat-resistant layer (functional layer)
10: Control device
11: Cathode
12: Separator (base material)
12a: Heat-resistant separator (function-provided separator)
13: Anode
20: Production apparatus for producing function-provided separator
21: Coating section
22: Depositing section (processing section)
23: Washing section (processing section)
25: Drying section (processing section)
26: Inspecting section
26c: Weight per unit area meter
Wt: Standby time (standby period)

The invention claimed is:
1. A method for producing a functional film comprising:
passing a first portion of a film base material through a coating section such that a first amount of coating material is applied on the first portion of the film base material;
processing the applied coating material in a processing section located downstream of the coating section, the processing section including: a drying section configured to dry the coating material on the film base material; and at least one section selected from the group consisting of (a) a solidifying section configured to solidify the coating material on the film base material and (b) a washing section configured to wash the film base material and the coating material on the film base material;
passing the first portion of the film base material through an inspecting section located downstream of the processing section, the inspecting section measuring the first amount of coating material on the first portion of the film base material;
adjusting, by a control device based on the measurement of the first amount of coating material by the inspecting section, operation of the coating section such that a second amount of coating material is applied to a second portion of the film base material upstream of the first portion of the film base material; and waiting, by the control device, for at least a standby period before making a subsequent adjustment to operation of the coating section, the standby period being based on a time for the second portion of the film base material to enter the inspecting section from the coating section.

2. The method as set forth in claim 1, wherein the inspecting section obtains a physical quantity to measure the first amount of coating material.

3. The method as set forth in claim 2, wherein the control device adjusts the operation of the coating section based on whether the physical quantity measured by the inspecting section crosses a threshold.

4. The method as set forth claim 2, wherein:
the physical quantity is a weight per unit area or a thickness of the film; or
the physical quantity is a weight per unit area or a thickness of a part of the film excluding the film base material.

5. The method as set forth in claim 1, wherein:
the coating section operates using a gravure coater method, and
the control device adjusts operation of the coating section by increasing or decreasing a rotation ratio of the gravure roll.

6. The method as set forth in claim 1, wherein:
the coating section operates using a bar coater method, and
the control device adjusts operation of the coating section by increasing or decreasing an amount of a gap between a coating bar and the film.

7. The method as set forth in claim 1, wherein:
the coating section operates using a die coater method, and
the control device adjusts operation of the coating section by increasing or decreasing a supplied liquid amount from a nozzle.

8. The method as set forth in claim 1, wherein the functional film is a battery separator.

9. A control device for controlling a production apparatus for producing a functional film, wherein:
the production apparatus includes (i) a coating section for applying a coating material to a film base material, (ii) a processing section for processing the applied coating material downstream of the coating section, the processing section including: a drying section configured to dry the coating material on the film base material; and at least one section selected from the group consisting of (a) a solidifying section configured to solidify the coating material on the film base material and (b) a washing section configured to wash the film base material and the coating material on the film base material, and (iii) an inspecting section downstream of the processing section, the inspecting section being configured to measure an amount of coating material on the film base material;

the control device:
receiving, from the inspecting section, a measurement of a first amount of coating material applied to a first portion of the film base material by the coating section;
adjusting, based on the received measurement of the first amount of coating material by the inspecting section, operation of the coating section such that a second amount of coating material is applied to a second portion of the film base material upstream of the first portion of the film base material; and
waiting for at least a standby period before making a subsequent adjustment to operation of the coating section, the standby period being based on a time for the second portion of the film base material to enter the inspecting section from the coating section.

10. A method for controlling a production apparatus for producing a functional film, wherein:
the production apparatus includes (i) a coating section for applying a coating material to a film base material, (ii) a processing section for processing the applied coating material downstream of the coating section, the processing section including: a drying section configured to dry the coating material on the film base material; and at least one section selected from the group consisting of (a) a solidifying section configured to solidify the coating material on the film base material and (b) a washing section configured to wash the film base material and the coating material on the film base material, and (iii) an inspecting section downstream of the processing section, the inspecting section being configured to measure an amount of coating material on the film base material;

the method comprising:
receiving, by a control device from the inspecting section, a measurement of a first amount of coating material applied to a first portion of the film base material by the coating section;
adjusting; by the control device based on the received measurement of the first amount of coating material by the inspecting section, operation of the coating section such that a second amount of coating material is applied to a second portion of the film base material upstream of the first portion of the film base material; and
waiting, by the control device, for at least a standby period before making a subsequent adjustment to operation of the coating section, the standby period being based on a time for the second portion of the film base material to enter the inspecting section from the coating section.

* * * * *